United States Patent
Katano et al.

(10) Patent No.: US 11,932,102 B2
(45) Date of Patent: Mar. 19, 2024

(54) VEHICLE AND MANUFACTURING METHOD OF VEHICLE

(71) Applicant: TOYOTA JIDOSHA KABUSHIKI KAISHA, Toyota (JP)

(72) Inventors: Koji Katano, Toyota (JP); Akihiko Ohba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 358 days.

(21) Appl. No.: 17/320,328

(22) Filed: May 14, 2021

(65) Prior Publication Data

US 2022/0009347 A1 Jan. 13, 2022

(30) Foreign Application Priority Data

Jul. 8, 2020 (JP) .................................. 2020-117462

(51) Int. Cl.
*B60K 15/067* (2006.01)
*B62D 65/02* (2006.01)
*B60K 15/03* (2006.01)

(52) U.S. Cl.
CPC ............ *B60K 15/067* (2013.01); *B62D 65/02* (2013.01); *B60K 2015/03486* (2013.01)

(58) Field of Classification Search
CPC ..................... B60K 2015/03486; B60K 15/067
See application file for complete search history.

(56) References Cited

U.S. PATENT DOCUMENTS

| 4,319,728 A * | 3/1982 | Pataki | F17C 13/084 |
| | | | 248/154 |
| 10,293,684 B2 * | 5/2019 | Sasaki | B60L 50/72 |
| 10,780,777 B2 * | 9/2020 | Sawada | B60K 15/067 |
| 2009/0133948 A1 * | 5/2009 | Ijaz | F17C 13/08 |
| | | | 220/628 |
| 2017/0101003 A1 * | 4/2017 | Zimmerman | B60K 15/067 |
| 2017/0240045 A1 * | 8/2017 | Ohashi | B60K 1/00 |
| 2022/0203826 A1 * | 6/2022 | Fujii | F17C 13/084 |

FOREIGN PATENT DOCUMENTS

| JP | 2006-322584 A | 11/2006 |
| JP | 2008-143463 A | 6/2008 |
| JP | 2012-127467 A | 7/2012 |
| JP | 2017-149316 A | 8/2017 |
| JP | 2017-172713 A | 9/2017 |
| JP | 2017-206042 A | 11/2017 |

* cited by examiner

*Primary Examiner* — Minnah L Seoh
*Assistant Examiner* — Hosam Shabara
(74) *Attorney, Agent, or Firm* — Finnegan, Henderson, Farabow, Garrett & Dunner, LLP

(57) ABSTRACT

A vehicle includes a tank having a cylindrical tank main unit, and a neck provided at a first end in an axial direction of the tank main unit, a bracket that fixes the tank main unit to a vehicle body of the vehicle by neck mounting, using the neck, and a fixing device. The fixing device has a covering portion that grips and holds, at a second end in the axial direction of the tank main unit, the tank main unit so as to surround an outer circumferential face of the tank main unit, and a fixing portion that is integrally provided with the covering portion and that is fixed to the vehicle body.

3 Claims, 7 Drawing Sheets

VEHICLE AND MANUFACTURING METHOD OF VEHICLE

CROSS-REFERENCE TO RELATED APPLICATION

This application claims priority to Japanese Patent Application No. 2020-117462 filed on Jul. 8, 2020, incorporated herein by reference in its entirety.

BACKGROUND

1. Technical Field

The present disclosure relates to a vehicle and a manufacturing method of the vehicle.

2. Description of Related Art

Japanese Unexamined Patent Application Publication No. 2017-206042 (JP 2017-206042 A) discloses a fixing mechanism provided with a neck mount that holds and fixes, to a vehicle body, a neck portion of a tank.

SUMMARY

The fixing mechanism described in JP 2017-206042 A necessitates the tank to have a neck. When the tank has necks on both ends thereof, the tank can be fixed at both ends. However, there are cases in which a neck is provided only to one end portion of the tank, or cases in which there is a neck at the other end portion but of a form that is unusable for fixing, and accordingly there has been demand for a fixing method that does not use necks for a second end side in the axial direction.

The present disclosure is able to realize the following aspects.

According to an aspect of the present disclosure, a vehicle including a tank is provided. The vehicle has a tank including a cylindrical tank main unit and a neck provided at a first end in an axial direction of the tank main unit, a bracket configured to fix the tank main unit to a vehicle body of the vehicle by neck mounting, using the neck, and a fixing device. The fixing device includes a covering portion configured to grip and hold, at a second end in the axial direction of the tank main unit, the tank main unit so as to surround an outer circumferential face of the tank main unit, and a fixing portion that is integrally provided with the covering portion and that is configured to be fixed to the vehicle body. Providing a neck requires a high-precise shape that can withstand internal pressure of the tank, which increases costs. Accordingly, an arrangement on the outer side of the tank main unit is desired. According to this aspect, the first end of the tank main unit at the neck side is fixed to the vehicle body by neck mounting using the bracket, and the second end is fixed to the vehicle body using the fixing device that is provided with the covering portion that grips and holds the tank main unit so as to surround the outer circumferential face of the tank main unit. Accordingly, the second end of the tank main unit can be fixed to the vehicle without using a neck.

In the vehicle according to the above aspect, the covering portion may include a plurality of arms that has elasticity and that is configured to grip the second end of the tank main unit from an outer circumferential side. According to this form, the tank main unit can be gripped from the outer circumferential side and fixed, using the arms that have elasticity. Accordingly, impact applied to the tank main unit can be absorbed by the elasticity of the arms, without providing a separate impact-absorbing mechanism.

In the vehicle according to the above aspect, an expanding graphite layer configured to cover at least the second end may be bonded to the tank main unit, and an outer diameter of the expanding graphite layer at a position not covered by the arms may be larger than an outer diameter of the expanding graphite layer at a position covered by the arms, at the second end of the tank main unit. According to this form, the outer diameter of the expanding graphite layer at a position not covered by the arms is larger than the outer diameter of the expanding graphite layer at a position covered by the arms at the second end of the tank main unit, and accordingly, even when the tank main unit is under force to rotate about the axis, there is interference between the arms and the expanding graphite layer, and consequently, the tank main unit can be suppressed from rotating.

In the vehicle according to the above aspect, an expanding graphite layer configured to cover an entirety of the tank main unit may be bonded to the tank main unit, and at least one of the arms may extend to a middle of the tank main unit in the axial direction. When a fire occurs due to some reason, the heat of the flames can be transmitted to the expanding graphite layer through the arm extended to the middle, and can be made to expand the expanding graphite layer. As a result, using the expanding graphite layer as a thermally-insulating and fire-resistant layer enables transmission of heat to the tank main unit to be suppressed.

In the vehicle according to the above aspect, the neck may include a small-diameter portion to which the bracket fits, and a clearance distance in the axial direction from a boundary between the tank main unit and the neck to the bracket in a state in which the bracket fits to the small-diameter portion may be shorter than a length in the axial direction from a distal end of a shortest arm of the arms to the second end of the tank main unit. According to this form, the tank main unit does not fall out even when moving in the axial direction.

According to an aspect of the present disclosure, a manufacturing method of a vehicle is provided. The manufacturing method of the vehicle includes attaching, to a second end in an axial direction of a cylindrical tank main unit to which a neck is provided at a first end, a fixing device that includes a covering portion configured to grip and hold the tank main unit so as to surround an outer circumferential face of the tank main unit, and a fixing portion that is integrally provided with the covering portion and that is configured to be fixed to the a vehicle body of the vehicle, and fixing the fixing device to an attaching portion of the vehicle body set in advance. According to this foam, the fixing device provided with the covering portion that grips and holds the tank main unit so as to surround the outer circumferential face of the tank main unit is attached, and thereafter the fixing device is fixed to the vehicle body. Accordingly, positional error between the fixing portion and the tank main unit at the time of fixing the tank main unit can be absorbed.

In the manufacturing method of a vehicle according to the above aspect, the first end of the tank main unit may be fixed to a different position from the attaching portion of the vehicle body by neck mounting using the neck. According to this form, the first end of the tank can be fixed to a different position of the vehicle by neck mounting, using the neck.

The present disclosure can be realized in various forms other than in a vehicle and a manufacturing method of the vehicle. For example, the present disclosure can be realized in a form of a fixing member of a tank, an attaching method of a tank, and so forth.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
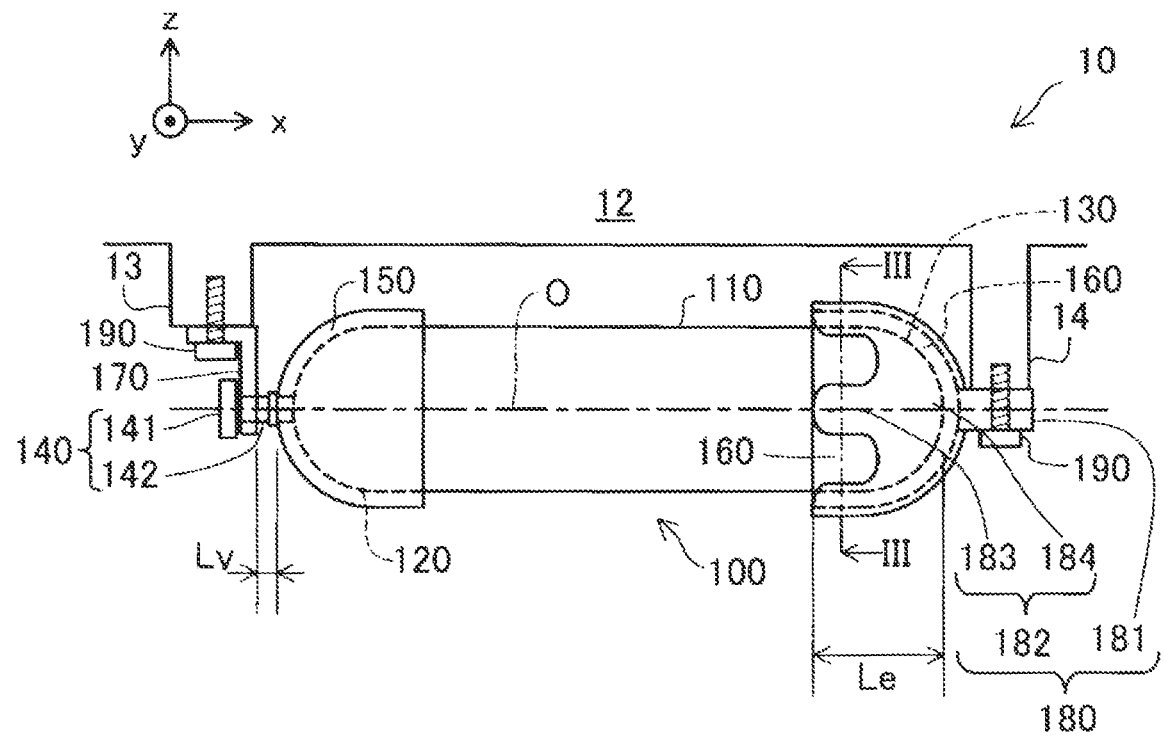
FIG. 1 is an explanatory diagram illustrating a fixing configuration of a vehicle body of a vehicle and a tank.

FIG. 1 is an explanatory diagram illustrating a fixing configuration of a vehicle body 12 of a vehicle 10 and a tank 100. The tank 100 stores a gas, such as hydrogen, liquified petroleum (LP) gas, or the like, which is used as fuel of the vehicle 10. The tank 100 is provided with a cylindrical cylinder portion 110, and substantially hemispherical domed portions 120 and 130 provided at respective ends in an axis O direction of the cylinder portion 110. The domed portion 120 has a neck 140 at the apex of the hemispherical portion, but the domed portion 130 has no neck. The part of the tank 100 excluding the neck 140 will be referred to as "tank main unit". Bonded to the domed portion 120 is an expanding graphite layer 150 that is substantially hemispherical in outer shape, such that the domed portion 120 is covered by the expanding graphite layer 150. Bonded to the domed portion 130 is an expanding graphite layer 160 that is substantially hemispherical in outer shape, such that the domed portion 130 is covered by the expanding graphite layer 160. The expanding graphite layers 150 and 160 include graphite particles and urethane resin. The graphite particles of the expanding graphite layers 150 and 160 expand under heat and are entwined with each other, thereby generating a thermal insulating layer having a large volume of gaps. That is to say, the expanding graphite layers 150 and 160 exhibit thermal insulating effects by rapidly expanding under a high-temperature environment and a layer of air being formed therein. The expanding graphite layers 150 and 160 are also flame resistant, and have fire-resistant properties. Even when the vehicle 10 is exposed to flames for some reason, for example, the expanding graphite layers 150 and 160 expand under the heat of the flames, and suppress the heat from being transmitted to the tank 100.

The neck 140 has a small-diameter portion 142 between the apex of the expanding graphite layer 150 and a distal end portion 141. A bracket 170 is attached to this small-diameter portion 142. The bracket 170 has two recessed parts, for example, and is attached such that the small-diameter portion 142 fits to the recesses. The bracket 170 is fixed to a bracket fixing portion 13 of the vehicle body 12, set in advance, by a bolt 190. That is to say, a first end of the tank 100, which is one end where the neck 140 is provided, is fixed to the bracket fixing portion 13 of the vehicle body 12 by so-called neck mounting by the bracket 170.

A second end in the axis O direction of the tank 100, which is the other end opposite to the one end where the neck 140 is provided, is provided with a fixing device 180. The fixing device 180 is formed of stainless steel, for example, and is provided with a fixing portion 181 and a covering portion 182. The fixing portion 181 and the covering portion 182 are formed integrally. The term "formed integrally" includes both of being formed of a single member and a plurality of members being joined by welding or the like, for example, to become a single part. The covering portion 182 has arms 183 and a cap portion 184. The cap portion 184 covers the apex of the expanding graphite layer 160. The arms 183 extend in the direction of the cylinder portion 110 from the cap portion 184. The arms 183 are formed of an elastic member capable of elastic deformation, and apply pressure in the radial direction of the tank 100. That is to say, the aims 183 grips and holds the tank 100 so as to surround the outer circumferential face of the tank 100. The tank 100 is around one percent larger in total length or diameter in a state when gas is filled therein, than in a state when gas is not filled therein. In the present embodiment, the aims 183 formed of an elastic member capable of elastic deformation grip and hold the tank 100 so as to surround the outer circumferential face of the tank 100, and accordingly the tank 100 can be held in a sure manner even when the size of the tank 100 changes due to changes in the state of being filled with gas.

In the example illustrated in FIG. 1, the number of the arms 183 is four, at fourfold rotationally symmetrical positions along the circumferential direction of the tank 100. The number of the aims 183 is not limited to four, and may be three or five, for example. Generally, it is sufficient for the number of the arms 183 to be n (wherein n is an integer of 3 or greater), and the aims 183 are at n-fold rotationally symmetrical positions. Accordingly, no force couple due to elastic force acts on the tank 100. Note that the arms 183 do not have to be at n-fold rotationally symmetrical positions, as long as the arms 183 are at positions where no force couple acts. Also, in an arrangement in which the arms 183 are broad in the circumferential direction, the number of arms may be two.

The fixing portion 181 is joined to the apex of the cap portion 184 at the opposite side from the arms 183. The fixing portion 181 is connected to an attaching portion 14 of the vehicle body 12, which differs from the bracket fixing portion 13, by a bolt 190. Note that the cap portion 184 does not have to be provided. That is to say, a configuration may be made in which the fixing portion 181 and the arms 183 are directly joined.

In the fixing state of the tank 100 illustrated in FIG. 1, the clearance distance at the bracket 170 between one end of the tank 100 and the bracket 170, i.e., the clearance distance from the apex of the expanding graphite layer 150 to the bracket 170, is denoted by Lv. Also, the covering length in the axis O direction at the second end of the tank 100 by the covering portion 182 of the fixing device 180, i.e., the length in the axis O direction from the distal ends of the arms 183 to the apex of the domed portion 130 of the tank 100 when the covering portion 182 maximally covers the expanding graphite layer 160, is denoted by Le. As long as the clearance distance Lv is shorter than the length Le, the tank 100 will not come loose from the fixing device 180 even when the tank 100 moves toward the direction of the neck 140 due to external force, for example. That is to say, the tank 100 can be suppressed from falling out.

Figure 2:
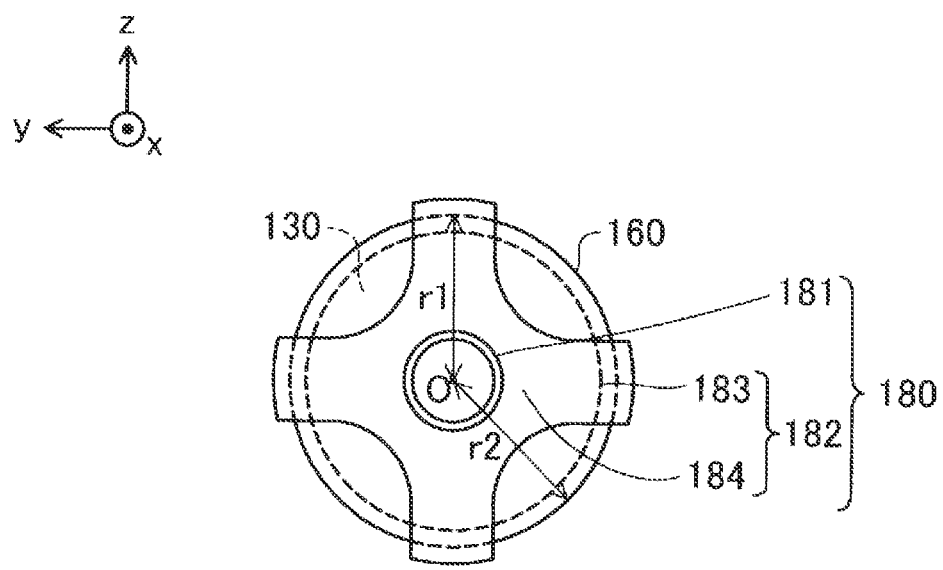
FIG. 2 is a diagram viewing the tank and a fixing device from an axial direction of the tank.

FIG. 2 is a diagram viewing the tank 100 and the fixing device 180 from the axis O direction of the tank 100. In this structure, the cap portion 184 of the fixing device 180 is placed over the apex of the expanding graphite layer 160, with the four arms 183 gripping the expanding graphite layer 160 from the four directions of above, below, right, and left. A distance r1 from the axis O of the tank 100 to the outer edge of the expanding graphite layer 160 at portions where the arms 183 are provided, and a distance r2 from the axis O of the tank 100 to the outer edge of the expanding graphite layer 160 at portions where the arms 183 are not provided, are approximately equal.

Figure 3:
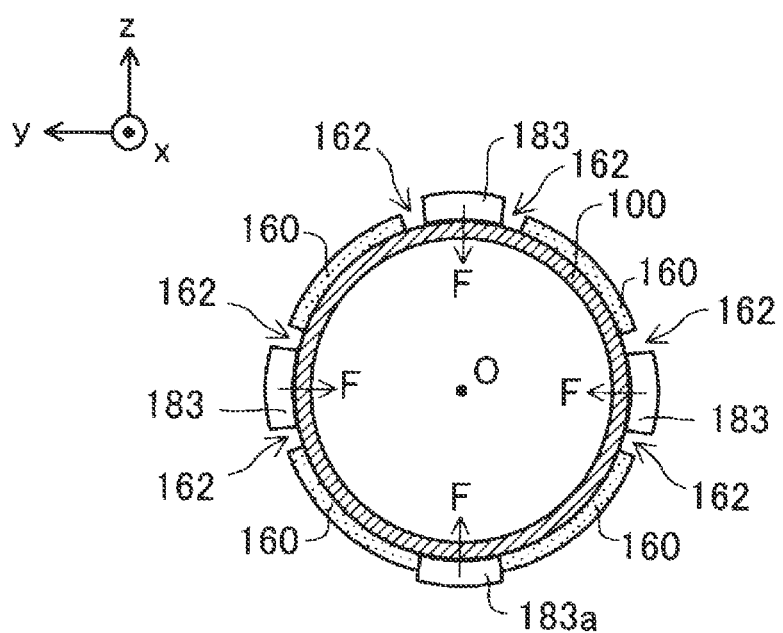
FIG. 3 is a cross-sectional view taken along III-III in FIG. 1.

FIG. 3 is a cross-sectional view taken along III-III in FIG. 1. The four arms 183 of the fixing device 180 are elastic members capable of elastic deformation as described above, and when the arms 183 grip the tank 100, the arms 183 grip in the direction of the axis O of the tank 100 by a force F. When the fixing device 180 is not placed over the domed portion 130, for example, the cross-section of the domed portion 130 perpendicular to the axis O is substantially circular, and accordingly, it is sufficient for the circle in internal contact with the arms 183 to have a shape in which the inner diameter thereof is smaller than the outer diameter of the domed portion 130. Note that the lower limit of the inner diameter of the circle in internal contact with the arms 183 may be a size that enables insertion of the domed portion 130, e.g., 70% to 80% of the outer diameter of the domed portion 130 or greater, is sufficient.

It can be seen from FIG. 3 that in this embodiment, the center axis O side of the four arms 183 of the fixing device 180 are in contact with the tank 100 from the four directions of above, below, right, and left, and the expanding graphite layer 160 is not provided between the arms 183 and the tank 100. Note however, that the expanding graphite layer 160 may be provided between the arms 183 and the tank 100. Also, the arms 183 are not in contact with the expanding graphite layer 160 in the circumferential direction, except for one arm 183 of the four arms 183, i.e., an arm 183*a* in the −z direction in FIG. 3. Note that in the present embodiment, the four arms 183 are of the same shape, but the arm 183 in the −z direction is denoted by the reference symbol 183*a* for sake of convenience with respect to relation with the shape of another member. That is to say, there is no gap between the arm 183*a* and the expanding graphite layer 160, but there are gaps 162 between the other arms 183 and the expanding graphite layer 160. Alternatively, it can be said that the gaps 162 between two expanding graphite layer 160 portions are larger at positions where the other aims 183 are disposed. By employing such a configuration, the arms 183 and 183*a* can be easily inserted into the gaps 162 between the expanding graphite layer 160 portions when assembling the fixing device 180 to the expanding graphite layer 160. Also, the one arm 183*a* is in contact with the expanding graphite layer 160 in the circumferential direction, which facilitates positioning of the fixing device 180 as to the expanding graphite layer 160. That is to say, both ease of insertion of the fixing device 180 and ease of positioning can be realized.

Figure 4:
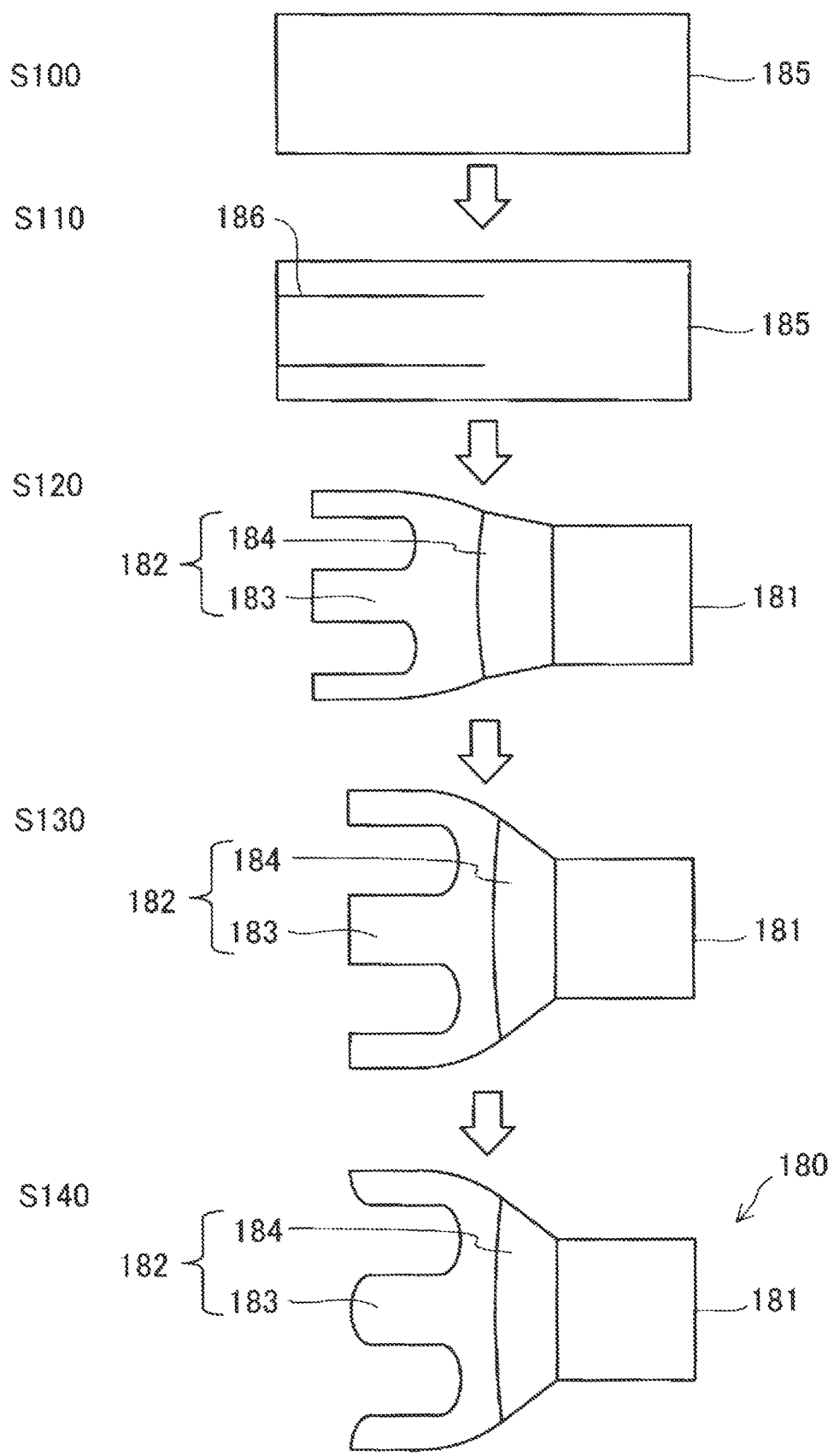
FIG. 4 is an explanatory diagram illustrating an example of manufacturing processes of the fixing device.

FIG. 4 is an explanatory diagram illustrating an example of manufacturing processes of the fixing device. In step S100, a pipe 185 formed of stainless steel is prepared. The diameter of the pipe 185 is the same as the diameter of the fixing portion 181 of the fixing device 180. In step S110, cuts 186 are made in one end portion of the pipe 185. When the number of the arms 183 is n, the number of the cuts 186 is n. Note that the cuts 186 may have a certain width in the circumferential direction. In steps S120 and S130, a jig is inserted to the inner side of the pipe 185 on the end in which the cuts 186 have been made, the diameter is expanded using the jig, and the arms 183 and the cap portion 184 are formed. In step S140, the corners of the distal ends of the arms 183 are rounded off.

Figure 5:
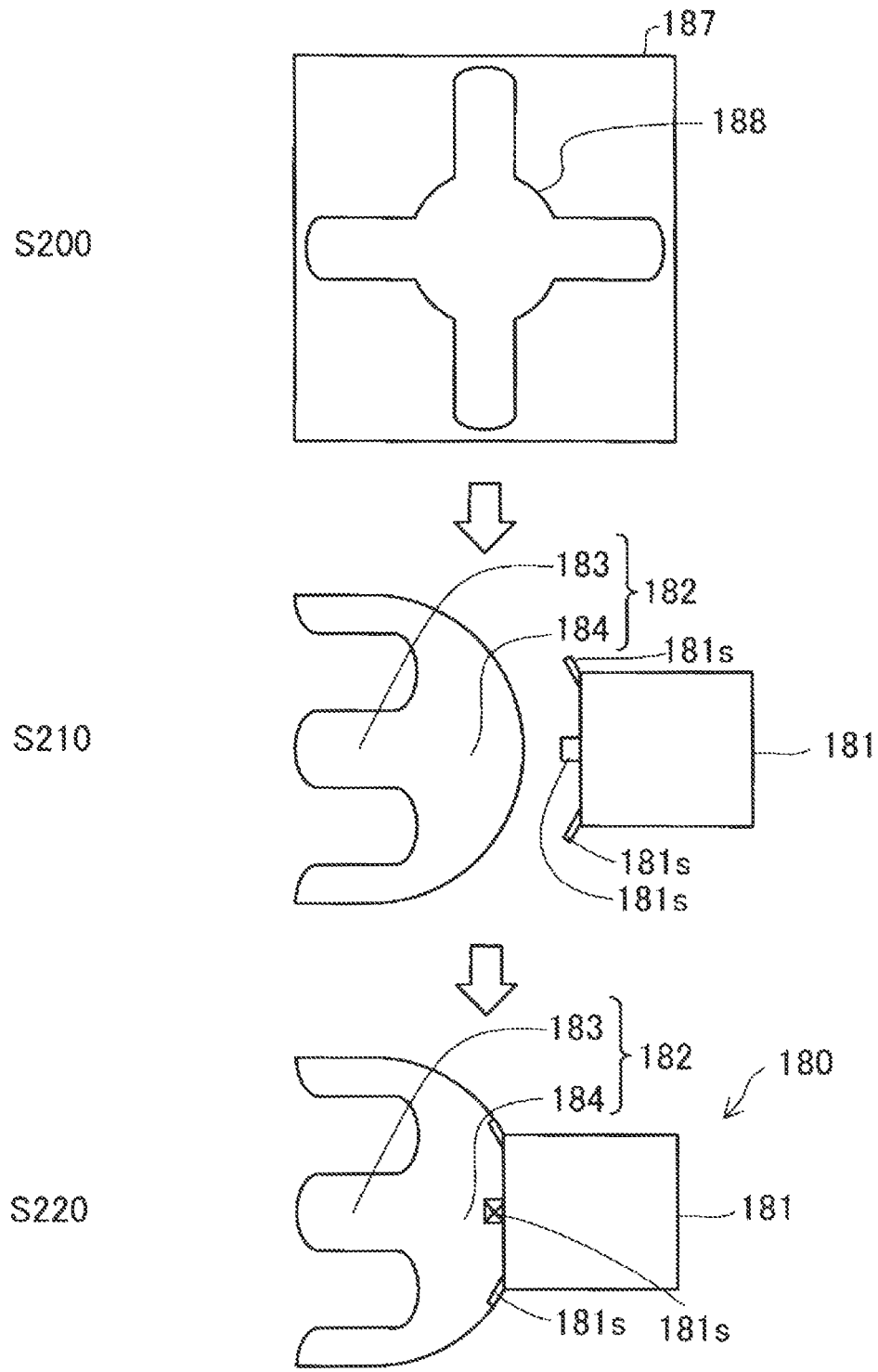
FIG. 5 is an explanatory diagram illustrating another example of manufacturing processes of the fixing device.

FIG. 5 is an explanatory diagram illustrating another example of manufacturing processes of the fixing device. In step S200, a plate 187 formed of stainless steel is prepared, and a substantially cross-shaped member 188 is punched out by a press. The member 188 is substantially cross-shaped since the number of the aims 183 is four. Accordingly, the shape of the member 188 differs depending on the number of the aims 183. In step S210, the substantially hemispherical covering portion 182 having the arms 183 and the cap portion 184 is formed by pressing the member 188. Note that when punching out the member 188 from the plate 187, the substantially hemispherical covering portion 182 may be processed at the same time. In step S220, the cylindrical fixing portion 181 is welded to the apex of the covering portion 182. For example, the fixing portion 181 has a welding margin 181*s* on one end portion, and this welding margin 181*s* is welded to the apex of the covering portion 182. The welding margin 181*s* can be easily formed by making a cut at one end portion of the fixing portion 181, for example, and bending the cut portion outwards. Note that when the number of the arms 183 is an even number, U-shaped members may be foamed by bending elongated plates in the form of the letter "U" by a press, and a plurality of the U-shaped members and the fixing portion 181 may be welded together.

Figure 6:
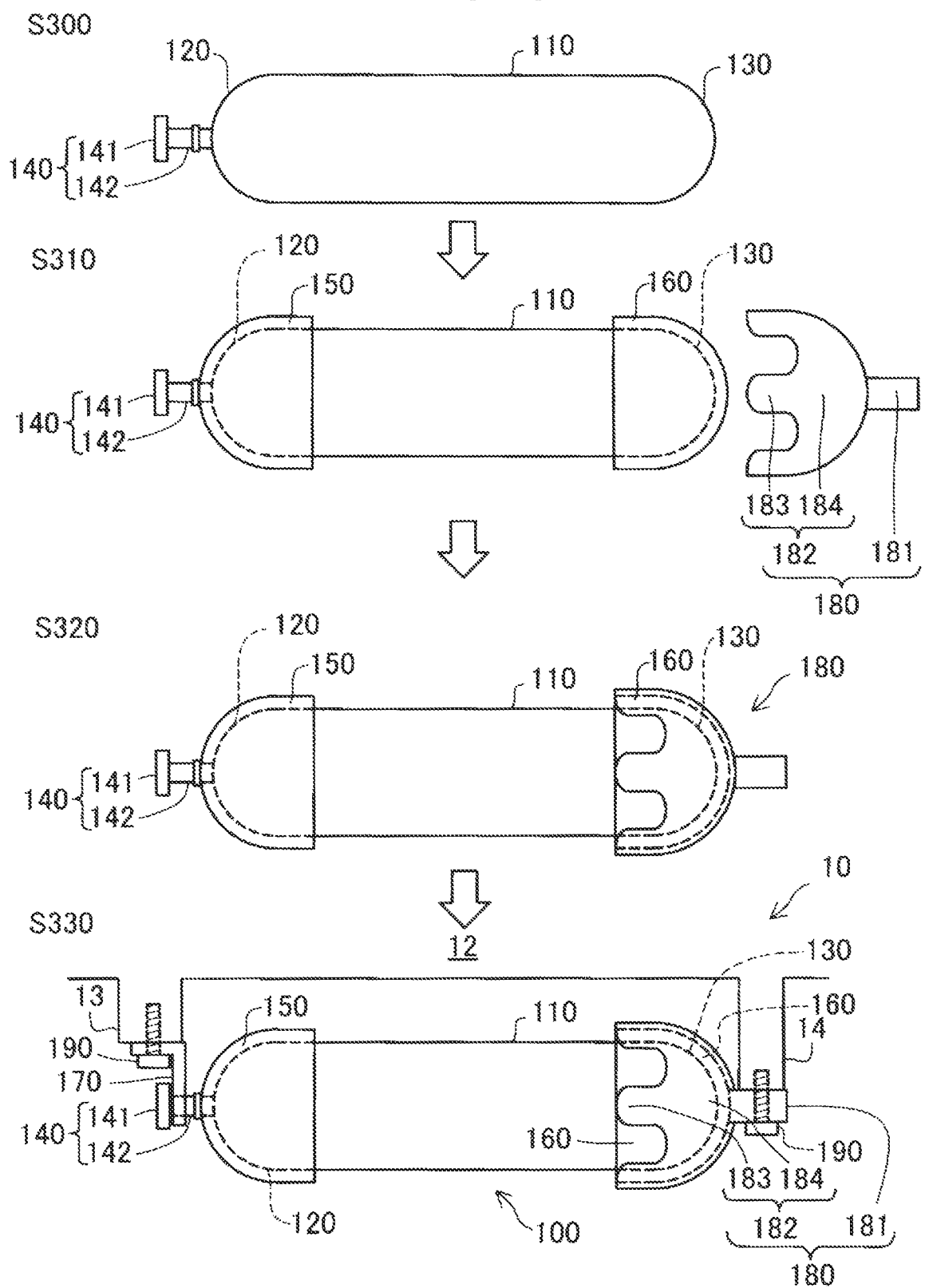
FIG. 6 is an explanatory diagram illustrating processes of attaching the tank to the vehicle.

FIG. 6 is an explanatory diagram illustrating processes of attaching the tank 100 to the vehicle 10. In step S300, the tank 100 is prepared. In step S310, the expanding graphite layers 150 and 160 are formed on the domed portions 120 and 130 of the tank 100. In step S320, the covering portion 182 of the fixing device 180 is placed over the expanding graphite layer 160. In step S320, the bracket 170 is attached so as to grip the small-diameter portion 142 of the neck 140, and the bracket 170 and the fixing device 180 are fixed to the vehicle body 12 by the bolts 190. Note that the neck 140 may be inserted into a hole formed in the bracket 170, and thereafter the neck 140 be attached to the tank 100. Thus, the bracket 170 need not have a divided structure.

As described above, according to the first embodiment, there are provided, at the first end on the domed portion 120 side of the tank 100, the bracket 170 that fixes the tank 100 to the vehicle body using the neck 140, and at the second end in the axis O direction on the domed portion 130 side of the tank 100, the fixing device 180 having the elastically deformable covering portion 182 provided with a portion having a smaller inner diameter than the outer diameter of the domed portion 130 and the fixing portion 181 that fixes the second end of the tank 100 to the vehicle body 12. Accordingly, the tank 100 can be attached to the vehicle body 12 of the vehicle 10 even without having a neck attached to the domed portion 130.

According to the first embodiment, the covering portion 182 of the fixing device 180 is provided with the arms 183 that grip the end portion of the tank 100 at the domed portion 130 side from the outer circumferential side, and accordingly the tank 100 can be held on the vehicle body 12 without providing a separate impact-absorbing mechanism.

According to the first embodiment, the clearance distance between the one end of the tank 100 and the bracket 170, i.e., the clearance distance Lv from the apex of the expanding graphite layer 150 to the bracket 170, is shorter than the covered length of the second end in the axis O direction of the tank 100 by the covering portion of the fixing device 180, i.e., the length Le in the axis O direction from the distal ends of the arms 183 to the apex of the domed portion 130 of the tank 100. Accordingly, even when external force is applied to the tank 100 and the tank 100 moves in the direction of the neck 140, the tank 100 does not come loose from the fixing device 180. That is to say, the tank 100 can be suppressed from falling out.

According to this first embodiment, the fixing device 180, which has the elastically-deformable covering portion 182 provided with the arms 183 that grip the second end of the tank 100 from the outer circumferential side and that have a smaller inner diameter than the outer diameter of the second end in the axis O direction of the tank 100, is attached to the second end of the cylindrical tank 100 that has the neck 140 on the first end in the axis O direction, and the fixing device 180 attached to the second end of the tank 100 is fixed to the vehicle body 12. Accordingly, positional error between the fixing device 180 and the tank 100 at the time of fixing the tank 100 to the vehicle body 12 can be absorbed.

Second Embodiment

Figure 7:
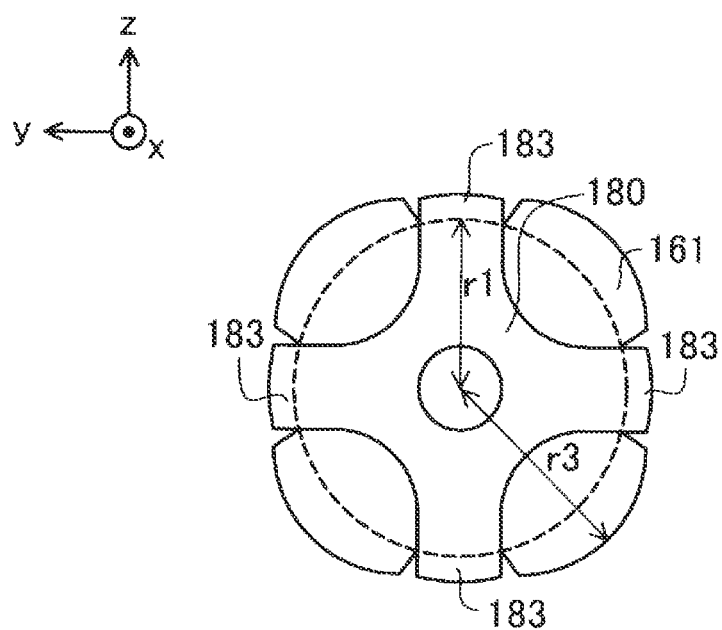
FIG. 7 is a diagram viewing a tank according to a second embodiment from the axial direction of the tank.

FIG. 7 is a diagram viewing the tank 100 according to a second embodiment from the axis O direction of the tank. The point of difference as compared to the first embodiment illustrated in FIG. 2 is the shape of an expanding graphite layer 161. That is to say, in the first embodiment, the distance r1 from the axis O of the tank 100 to the outer edge of the expanding graphite layer 160 at portions where the arms 183 are provided, and the distance r2 from the axis O of the tank 100 to the outer edge of the expanding graphite layer 160 at portions where the arms 183 are not provided, are approximately equal, and substantially hemispherical. Conversely, in the second embodiment, a distance r3 from the axis O of the tank 100 to the outer edge of the expanding graphite layer 161 at portions where the arms 183 are not provided is greater than the distance r1 from the axis O of the tank 100 to the outer edge of the expanding graphite layer 161 at portions where the arms 183 are provided. That is to say, the expanding graphite layer 161 bulges outwards from the substantially hemispherical shape at the portions where the arms 183 are not provided. Accordingly, the following advantage is obtained in addition to the advantages of the first embodiment. That is to say, even when the tank 100 is under force to rotate as to the fixing device 180, there is interference between the expanding graphite layer 161 and the aims 183. As a result, the tank 100 can be suppressed from rotating as to the fixing device 180.

Third Embodiment

Figure 8:
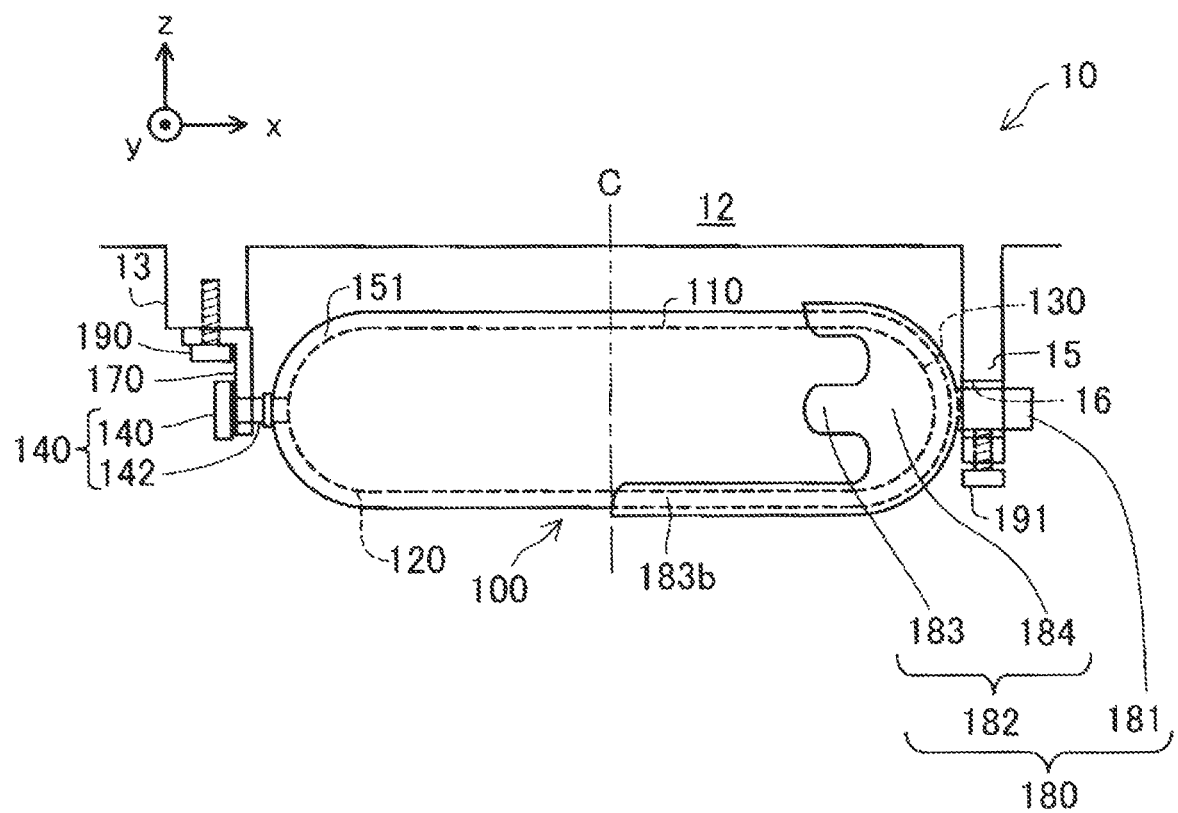
FIG. 8 is an explanatory diagram illustrating a third embodiment.

FIG. 8 is an explanatory diagram illustrating a third embodiment. In comparison with the first embodiment, in the third embodiment, one arm 183b at the bottom in the vertical direction extends to the middle C of the tank 100 in the axis O direction (i.e., in the x direction). Also, the expanding graphite layer 151 covers the entirety of the tank 100. The arm 183b can support the tank 100 from below in the vertical direction. Also, when a fire occurs on the lower side of the vehicle for some reason, the flames heat the arm 183b from below the tank 100. Thereafter, the heat of the arm 183b is transmitted to the expanding graphite layer 151, and the expanding graphite layer 151 expands. As a result, in addition to the advantages of the first embodiment, according to the third embodiment, the expanding graphite layer 151 that expands due to the flames thermally insulates the tank 100 and protects the tank 100 from the heat. Note that when assuming that a fire will occur at a position other than the lower side of the vehicle, the arm 183b in the direction in which the fire will occur may be extended as far as the middle C of the tank 100 in the axis O direction. Also note that forming the arm 183b to be longer than the other arms 183 is sufficient, and the arm 183b does not have to extend as far as the middle C of the tank 100 in the axis O direction. The arm 183b may also extend beyond the middle C of the tank 100 in the axis O direction.

The method of fixing the fixing device 180 may be a fixing method other than the fixing method illustrated in FIG. 1. For example, a fixing method illustrated in FIG. 8 may be used. In this fixing method, the vehicle body 12 of the vehicle 10 has an attaching portion 15 that has a through hole 16. The fixing portion 181 of the fixing device 180 is inserted through this through hole 16, and is fixed by a bolt 191. Specifically, the fixing portion 181 of the fixing device 180 is first inserted into the through hole 16 of the attaching portion 15, the bracket 170 is fixed to the bracket fixing portion 13 using the bolt 190, and thereafter the fixing portion 181 is fixed using the bolt 191. According to this method, no through hole through which the bolt 190 passes needs to be formed on the fixing portion 181 of the fixing device 180. Also, when fixing the bracket 170 to the bracket fixing portion 13, the tank 100 can be supported by the fixing portion 181 inserted through the through hole 16.

Fourth Embodiment

Figure 9:
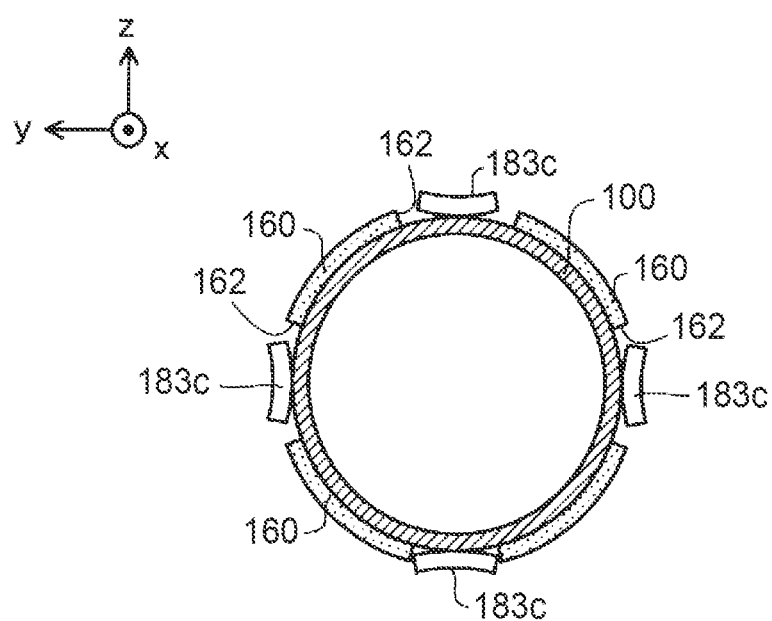
FIG. 9 is an explanatory diagram illustrating a cross-section perpendicular to an axis of a tank according to a fourth embodiment.

FIG. 9 is an explanatory diagram illustrating a cross-section perpendicular to an axis O of a tank according to a fourth embodiment. In comparison with the first embodiment illustrated in FIG. 3, the shapes of arms 183c are different. The arms 183 in the first embodiment are outwardly convex along the outer shape of the tank 100, while the arms 183c according to the fourth embodiment are inwardly convex against the surface side of the tank 100. In addition to the advantages of the first embodiment, the fourth embodiment has an advantage that the tank 100 is not readily scratched, since the smooth convex faces of the arms 183c are in contact with the surface of the tank 100.

Although the tank 100 has been described in the above embodiments as being provided with the domed portions 120 and 130 on respective ends of the cylinder portion 110 in the axis O direction, a configuration may be made where the domed portions 120 and 130 are not provided and only the cylinder portion 110 is provided. The ends of the cylinder portion 110 can be fixed to an attaching portion 14 of the vehicle body 12 using two fixing devices 180.

Although description has been made in the above embodiments that the neck 140 is provided to just the one domed portion 120, a neck may be provided to the other domed portion 130 as well. The domed portion 130 side can also be fixed using the fixing device 180.

The present disclosure is not limited to the above-described embodiments, and can be realized through various configurations without departing from the essence thereof.

For example, the technical features of the embodiments corresponding to the technical features of the aspects described in the SUMMARY may be substituted or combined as appropriate, in order to solve part or all of the above-described problems, or to achieve part or all of the above-described advantages. The technical features can also be omitted as appropriate, as long as they are not described as being indispensable in the present specification.

What is claimed is:

1. A vehicle, comprising:
   a tank including a cylindrical tank main unit, and a neck provided at a first end in an axial direction of the tank main unit;
   a bracket configured to fix the tank main unit to a vehicle body of the vehicle by neck mounting, using the neck; and
   a fixing device, wherein the fixing device includes a covering portion configured to grip and hold, at a second end in the axial direction of the tank main unit, the tank main unit so as to surround an outer circumferential face of the tank main unit, the covering portion including a plurality of arms that has elasticity and that is configured to grip the second end of the tank main unit from an outer circumferential side, and a fixing portion that is integrally provided with the covering portion and that is configured to be fixed to the vehicle body,
   wherein
   an expanding graphite layer configured to cover at least the second end is bonded to the tank main unit, and
   an outer diameter of the expanding graphite layer at a position not covered by the arms is larger than an outer diameter of the expanding graphite layer at a position covered by the arms at the second end of the tank main unit.

2. The vehicle according to claim 1, wherein at least one of the arms extends to a middle of the tank main unit in the axial direction.

3. The vehicle according to claim 1, wherein: the neck includes a small-diameter portion to which the bracket fits; and a clearance distance in the axial direction from a boundary between the tank main unit and the neck to the bracket in a state in which the bracket fits to the small-diameter portion is shorter than a length in the axial direction from a distal end of a shortest arm of the arms to the second end of the tank main unit.

* * * * *